United States Patent [19]
Savignano

[11] 3,726,011
[45] Apr. 10, 1973

[54] APPARATUS FOR SECURING ARTIFICIAL TOOTH TO A JAW

[76] Inventor: Joseph Richard Savignano, c/o Fred's Trailer Court, P. O. Box 285, R. D. No. 4, Scotia, N.Y. 12302

[22] Filed: July 19, 1971

[21] Appl. No.: 163,590

[52] U.S. Cl. .................................. 32/10 A, 32/13
[51] Int. Cl. ........................................... A61c 13/00
[58] Field of Search ........................ 32/13, 12, 2, 8, 32/10 A, 10

[56] References Cited
UNITED STATES PATENTS

| 1,517,500 | 12/1924 | Fredericks | 32/13 |
| 2,411,758 | 11/1946 | Ruetz | 32/13 |

*Primary Examiner*—Robert Peshock
*Attorney*—Robert E. Heslin et al.

[57] ABSTRACT

Apparatus for securing an artificial tooth to a jaw including a threaded stud member which screws into the jawbone, a spring-type clasp preferably having projecting studs and with the clasp screwed to the stud, and a housing for the tooth which engages with a snap-type arrangement with the clasp, the exterior tooth surfaces being molded to the housing.

7 Claims, 4 Drawing Figures

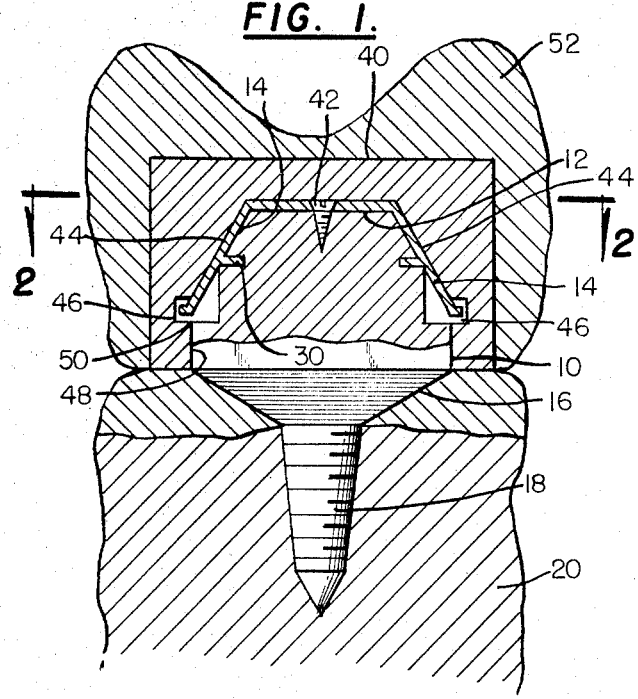
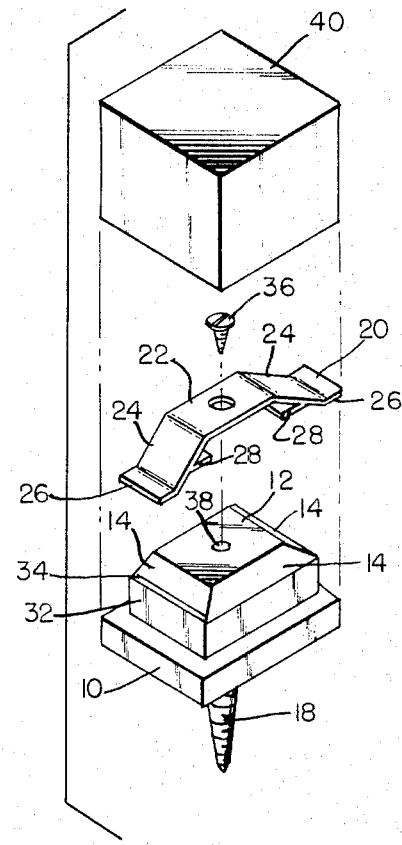
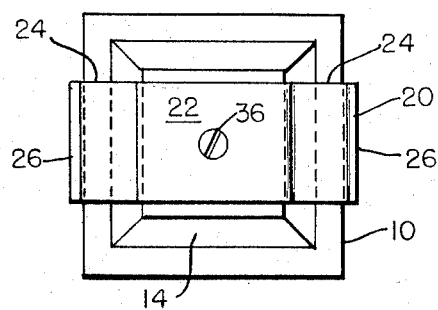
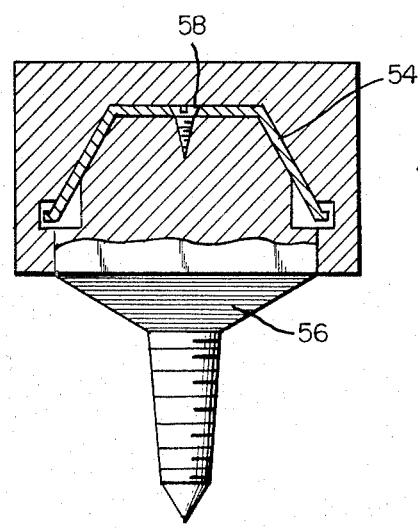
INVENTOR
Joseph R. Savignano
BY George Vande Sande
ATTORNEY

APPARATUS FOR SECURING ARTIFICIAL TOOTH TO A JAW

BACKGROUND OF THE INVENTION

Numerous techniques have been devised for securing an artificial tooth to the jawbone, and some of these techniques include the use of a threaded screw member which is threaded into the jawbone. Various techniques are also known for securing the tooth member to the threaded stud, but these techniques are not fully satisfactory since they do not provide a relatively quick and convenient way of securing the tooth portion, nor do they provide reliably tight engagement of the tooth portion with the stud.

SUMMARY OF THE INVENTION

The invention provides an improved manner of securing a tooth to the jawbone and includes a threaded stud which is capable of being screwed into the jawbone and supporting thereon a spring-like clasp which may be held to the stud by a screw. The configuration of the clasp is such that a complementary housing member, which may be generally in the form of a rectangular solid, can be snapped into place over the stud with the attached clasp being effectively locked in place so that there is virtually no danger of its being inadvertently detached. In the preferred embodiment of the invention, the clasp includes a plurality of inwardly extending tab portions, and these are so arranged as to interlock with correspondingly configured indentations in the threaded stud. The external tooth surfaces may be molded to the housing by means of known techniques.

BRIEF DESCRIPTION OF THE DRAWINGS

In the drawings:

FIG. 1 is a side cross-sectional view of a preferred embodiment of the invention;

FIG. 2 is a cross-sectional view taken along the section line 2—2 of FIG. 1;

FIG. 3 is an exploded view of the several parts comprising the apparatus of FIG. 1; and FIG. 4 is a cross-sectional view in elevation of an alternative embodiment of the invention.

DETAILED DESCRIPTION OF THE PREFERRED EMBODIMENTS

Referring to FIGS. 1, 2, and 3 which illustrate the preferred embodiment, it can be seen that the stud 10 is provided with an upper portion having a generally flat upper surface 12 and sloping side wall portions 14. The bottom portion of the stud 10 tapers conically downwardly at 16, and the lowermost portion comprises a generally tapered and pointed threaded portion 18 which may be threaded directly into the jawbone represented at 20.

Secured to the topmost portion of the stud 10 is a spring-like clasp 20 having a generally flat center portion 22 and a pair of dependent leg portions 24 each of which terminates in an outwardly extending flexible blade-like portion 26. The clasp 20 further includes two inwardly extending projecting tab portions 28 each of which extends inwardly from one of the sloping side wall portions 24 and lies in a plane generally parallel to the plane of the top portion 22. When the spring lock member 22 is installed in place on the stud 10, the inwardly projecting tabs 28 fit into corresponding recesses 30 which extend laterally along opposing sides of stud 10 substantially at the junction between each sloping side wall portion 14 of stud 10 and the adjoining vertically upstanding wall portion 32. Thus, the clasp can be securely fastened to the stud 10 by placing the clasp on top of the stud with the inwardly projecting tabs 28 fitting into the elongate slots 30 and with the two elements rigidly secured by means of a screw 36 threaded into the tap hole 38 in the top surface 12 of stud 10.

The tooth housing 40 may be in the form of a rectangular solid. The inner part of the housing 40 is hollowed out with a configuration adapted to receive the top portion of stud 10 with the clasp 20 secured thereto. Thus, the housing 40 has its inner aperture formed with a generally flat surface at 42 and sloping side wall portions 44, and is also provided with an outwardly extending recess 46 which is adapted to receive the outwardly extending tabs 26 of spring stud member 20. It will be appreciated that when the housing 40 is placed upon the assembled combination of stud 10 and spring clasp 20, the sloping portions 24 of clasp 20 must necessarily be deflected downwardly in order that the inner walls 48 of the aperture can pass over the outwardly extending tabs 26. However, as the housing 40 is pressed downwardly, the portions 24 flex inwardly until such time that the tabs 26 again snap outwardly into the recesses 46 whereupon the housing is then securely held in place and cannot be removed since obviously any attempt to lift the housing 40 upwardly will cause the shoulder 50 to bear against the underside of the tabs 26 and completely prevent removal of the housing 40.

By means of known techniques, it is possible for the exterior tooth surfaces 52 to be molded onto the housing 40.

In the alternative embodiment of FIG. 4, the construction of the several parts is very much the same as in FIGS. 1-3. However, there is one difference in that the spring clasp 54 in FIG. 4 does not have the inwardly extending tabs corresponding to tabs 28 of FIG. 3, nor are there corresponding lateral slots on the exterior surface of stud 56 which are comparable to the slots 30 shown in FIG. 3. Nevertheless, the spring clasp 54 is securely held to the stud 56 by means of threaded screw 58. It will be apparent that one of the advantages of the embodiment of FIGS. 1-3 over that of FIG. 4 is that in the embodiment of FIGS. 1-3 there is a more rigid securing of the clasp 20 to the stud 10 by reason of the tabs 28 fitting into the slots 34 which is particularly effective therefore in resisting any tendency of the side portions 24 and 26 of the spring clasp 20 to be deflected upwardly when forces are exerted on the tooth tending to remove it from its intended position. In other words, in the embodiment of FIGS. 1-3, the inwardly projecting tabs 28 tend to resist strongly any effort of the portions 24 and 26 of spring clasp 20 to be deflected upwardly and outwardly from the mating surfaces of the stud.

What I claim is:

1. Means for implanting an artificial tooth in the jawbone comprising in combination, a stud anchored securely into the jawbone and having a tooth supporting portion which extends above the jawbone, at least one thin flexible blade-like member secured to said stud and extending laterally outwardly therefrom, and a hollowed tooth housing defining an interior cavity to snugly receive said stud and the attached member, said housing cavity having an interior dimension at its entrance end which is less than that of said blade-like member in its unflexed condition such that said housing can be moved into this final intended position on said stud only by flexure of said flexible member in the direction of movement of said housing into its intended position on said stud, said housing defining an outwardly extending recess in the wall of its cavity to receive said flexible member in its normal substantially unflexed position, said recess and said member being so positionally interrelated that said flexible member snaps into position in said recess as said housing assumes its final intended position on said stud, the outer surfaces of said tooth being secured to the outer surfaces of said housing.

2. The combination of claim 1 in which said flexible member forms part of a spring clasp which extends across and is rigidly secured to said stud.

3. The combination of claim 2 in which said spring clasp has a flexible member at each end extending outwardly of said stud.

4. The combination of claim 3 in which said spring clasp is secured to said stud by a screw.

5. The combination of claim 3 in which said spring clasp is formed to have a flat central portion which is secured to said stud, a pair of slanting surfaces symmetrically disposed about either side of said central portion and adapted to overlie opposite side portions of said stud, and short outwardly extending tab portions which are engaged by inner surfaces of the cavity of said housing upon the placement of said housing on said stud and are thereby bent inwardly toward the sides of said stud.

6. The combination of claim 5 in which at least one of said sloping surfaces on spring clasp has an inwardly extending integral tab portion and the mating portion of said stud has a recess to receive said inwardly extending tab portion.

7. The combination of claim 1 in which said stud is provided with a threaded shaft portion which is adapted to be screwed into the jawbone.

* * * * *